United States Patent
Rosenberger et al.

(10) Patent No.: US 12,509,386 B2
(45) Date of Patent: Dec. 30, 2025

(54) METHOD OF MANUFACTURING A PREFORM OF AN ANTIRESONANT HOLLOW CORE FIBRE

(71) Applicant: Heraeus Quarzglas GmbH & Co. KG, Hanau (DE)

(72) Inventors: Manuel Rosenberger, Kleinostheim (DE); Yusuf Tansel, Kleinostheim (DE); Enrico Ehrentraut, Hanau (DE); Benjamin Reis, Kleinostheim (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 229 days.

(21) Appl. No.: 18/267,777

(22) PCT Filed: Nov. 12, 2021

(86) PCT No.: PCT/EP2021/081466
§ 371 (c)(1),
(2) Date: Jun. 15, 2023

(87) PCT Pub. No.: WO2022/128273
PCT Pub. Date: Jun. 23, 2022

(65) Prior Publication Data
US 2024/0092680 A1     Mar. 21, 2024

(30) Foreign Application Priority Data
Dec. 16, 2020  (EP) .................... 20214481

(51) Int. Cl.
*C03B 37/012*    (2006.01)
*C03B 37/027*    (2006.01)

(52) U.S. Cl.
CPC .... *C03B 37/0122* (2013.01); *C03B 37/02781* (2013.01); *C03B 2203/16* (2013.01); *C03B 2203/42* (2013.01)

(58) Field of Classification Search
None
See application file for complete search history.

(56) References Cited

U.S. PATENT DOCUMENTS

| 2004/0228592 A1 | 11/2004 | Gaeta et al. |
| 2010/0030429 A1 | 2/2010 | Kuramori |

(Continued)

FOREIGN PATENT DOCUMENTS

| CN | 103951181 A | 7/2014 |
| CN | 106495464 A | 3/2017 |

(Continued)

OTHER PUBLICATIONS

DE 102014011041 machine translation, Frosch et al., Optical Flow-through Hollow Fiber, Jan. 2016 (Year: 2016).*

(Continued)

*Primary Examiner* — Queenie S Dehghan
(74) *Attorney, Agent, or Firm* — Panitch Schwarze Belisario & Nadel LLP (57) ABSTRACT

A method for producing a preform of an anti-resonant hollow-core fiber, which has a hollow core extending along a fiber longitudinal axis, and a cladding region surrounding the hollow core and includes at least one anti-resonance element. The method includes (a) providing a cladding tube having a cladding tube inner surface and a cladding tube outer surface, at least one anti-resonance element preform being arranged at the cladding tube inner surface, (b) providing an overlay tube including an overlay tube inner surface, the overlay tube having an inner diameter larger than an outer diameter of the cladding tube, (c) arranging the cladding tube inside the overlay tube, so that the overlay tube inner surface surrounds the cladding tube outer surface, (Continued)

and (d) adding the overlay tube to the cladding tube, so that the overlay tube inner surface connects to the cladding tube outer surface.

19 Claims, 4 Drawing Sheets

(56) References Cited

U.S. PATENT DOCUMENTS

| | | |
|---|---|---|
| 2010/0303429 A1 | 12/2010 | Gibson et al. |
| 2017/0160467 A1 | 6/2017 | Poletti et al. |
| 2020/0024178 A1 | 1/2020 | Corrado et al. |
| 2022/0153625 A1 | 5/2022 | Benabid et al. |
| 2023/0358948 A1 | 11/2023 | Russell et al. |

FOREIGN PATENT DOCUMENTS

| | | | |
|---|---|---|---|
| CN | 108351465 A | 7/2018 | |
| CN | 109476526 A | 3/2019 | |
| CN | 110662990 A | 1/2020 | |
| CN | 111095059 A | 5/2020 | |
| EP | 3136143 A1 | 3/2017 | |
| JP | 2007051024 A | 3/2007 | |
| WO | WO-2004095099 A1 * | 11/2004 | ......... C03B 37/0122 |
| WO | WO-2017186246 A1 * | 11/2017 | ......... C03B 37/0122 |
| WO | 2018210598 A1 | 11/2018 | |
| WO | 2019053412 A1 | 3/2019 | |
| WO | 2020187594 A1 | 9/2020 | |

OTHER PUBLICATIONS

WO 2014036853 machine translation, Yan et al., Large Size Solid Fiber Preform, Mar. 2014 (Year: 2014).*
EP 3 771 696 machine translation, Rosenberger et al., Method and Intermediate Product for Producing a Hollow Core Fibre, Feb. 2021 (Year: 2021).*
Office Action issued Dec. 23, 2024 in CN Application No. 202180078088.7.
Hartung et al., "Low-loss single-mode guidance in large-core antiresonant hollow-core fibers," Optics Letters, vol. 40, No. 14, pp. 3432-3435 (Jul. 15, 2015).
Jasion et al., "Fabrication of tubular anti-resonant hollow core fibers: modelling, draw dynamics and process optimization," Optics Express, vol. 27, No. 15, pp. 1-16 (Jul. 22, 2019).
International Search Report issued on Feb. 14, 2022, in corresponding application PCT/EP2021/081466.
Bradley et al., "Record Low-Loss 1.3dB/km Data Transmitting Antiresonant Hollow Core Fibre," ECOC PDP, 3 pages (2018).
Poletti, F., "Nested antiresonant nodeless hollow core fiber," Optics Express, vol. 22, No. 20, pp. 23807-23828 (2014).

* cited by examiner

METHOD OF MANUFACTURING A PREFORM OF AN ANTIRESONANT HOLLOW CORE FIBRE

CROSS-REFERENCE TO RELATED APPLICATIONS

This application is a Section 371 of International Application No PCT/EP2021/081466, filed Nov. 12, 2021, which was published in the English language on Jun. 23, 2022, under International Publication No. WO 2022/128273 A1, which claims priority under 35 U.S.C. § 119(b) to European Application No. 20214481.2 filed Dec. 16, 2020, the disclosures of each of which are incorporated herein by reference.

The invention relates to a method for producing a preform of an anti-resonant hollow-core fiber.

BACKGROUND OF THE INVENTION

Conventional single-mode optical fibers of solid material have a core region of glass, which is surrounded by a cladding region of glass with a lower refractive index. The light guidance is thereby based on total reflection between core and cladding region. The interactions of the guided light with the solid material, however, are associated with an increased latency during the data transmission, and relatively low damage thresholds compared to high-energy radiation.

"Hollow-core fibers", in the case of which the core comprises an evacuated cavity, which is filled with gas or liquid, avoid or reduce these disadvantages. In hollow-core fibers, the interaction of the light with the glass is smaller than in solid core fibers. The refractive index of the core is smaller than that of the cladding, so that a light guidance by means of total reflection is not possible, and the light would usually escape from the core into the cladding. Depending on the physical mechanism of the light guidance, hollow-core fibers are divided into "photonic bandgap fibers" and "anti-resonant hollow-core fibers".

In the case of "photonic bandgap fibers", the hollow core region is surrounded by a cladding, in which small hollow ducts are arranged periodically. The periodic structure of the hollow ducts in the cladding causes the effect, which, with reference to the semiconductor technology, is referred to as "photonic bandgap", according to which light of certain wavelength ranges scattered at the cladding structures interferes constructively due to Bragg reflection in the central cavity, and cannot propagate transversely in the cladding.

In the case of the embodiment of the hollow-core fiber, which is referred to as "anti-resonant hollow-core fiber" (ARHCF), the hollow core region is surrounded by an inner cladding region, in which so-called "anti-resonant elements" (or "anti-resonance elements"; in short "AREs") are arranged. The walls of the anti-resonance elements, which are evenly distributed around the hollow core, can act as Fabry-Perot cavities, which are operated in anti-resonance and which reflect the incident light and guide it through the fiber core.

This fiber technology promises a low optical attenuation, a very broad transmission spectrum (also in the UV or IR wavelength range), and a small latency during the data transmission.

Potential applications of the hollow-core fibers are in the field of the data transmission, the high-performance beam guidance, for example for the material processing, the modal filtration, the non-linear optics, in particular for the supercontinuum generation, from the ultraviolet to the infrared wavelength range.

Prior Art

One disadvantage of anti-resonant hollow-core fibers is that modes of a higher order are not necessarily suppressed, so that they are often not purely of a single mode over large transmission lengths, and the quality of the output beam deteriorates.

In the paper by Francesco Poletti "Nested antiresonant nodeless hollow core fiber"; Optics Express, Vol. 22, No. 20 (2014); DOI: 10.1364/OE 22.023807, a fiber design is proposed, in the case of which anti-resonance elements are not formed as a simple singular structural element, but consist of several structural elements, which are nested. The nested anti-resonance elements are designed in such a way that core modes of a higher order are phase-adapted to the cladding modes and are suppressed, but not the fundamental core mode. The propagation of the fundamental core mode is thus always ensured, and the hollow-core fiber can be effectively made to be of a single mode over a limited wavelength range.

The effective mode suppression is a function of the center wavelength of the transmitted light and of the structural parameters of the fiber design, such as the radius of the hollow core, and the diameter difference of nested ring structures in the anti-resonance elements.

An anti-resonant hollow-core fiber is known from EP 3 136 143 A1 (referred to therein as "hollow-core fiber without bandgap"), in the case of which the core can also guide further modes, in addition to the fundamental mode. For this purpose, said core is surrounded by an inner cladding comprising "non-resonant elements", which provide a phase adaptation of anti-resonant modes with the higher modes. The production of the hollow-core fiber takes place according to a so-called "stack-and-draw" technique, in that the output elements are arranged to form an axially parallel ensemble, and are fixed to form a preform, which is elongated subsequently. A cladding tube comprising a hexagonal inner cross section is used thereby, and six so-called "ARE preforms" (anti-resonance element preforms) are fixed in the inner edges of the cladding tube. This preform is stretched in two stages to form a hollow-core fiber.

The exact and reproducible production of a preform proves to be difficult because already small dimensional deviations negatively impact the effectiveness of the light guidance. In particular with increasing wall thickness of the cladding tube and an associated need for supplied heat, uncontrolled deformation occurs during the connection of cladding tube and anti-resonance element preforms. It can thus be advantageous to use a comparatively thin-walled cladding tube for the connection to the anti-resonance element preforms, and to encompass it in a separate method step by means of an overlay tube made of massive glass in order to set the desired wall thickness.

The connection of overlay tube to cladding tube (the so-called "adding") and the drawing into the final glass fiber can thereby be performed in a concerted step or in two steps, which are separated from one another. Even if a direct drawing into the final glass fiber does not take place, it is possible to combine the adding with a partial elongating in order to reduce the preform in its diameter, and to thus prepare it for the final drawing.

A method for producing a microstructured optical fiber is known from US 2010/030429 A1, in the case of which a preform, consisting of a core comprising a plurality of microtubes and an overlay tube made of massive glass, which encases the core, is drawn into an optical fiber. To connect core and overlay tube during the stretching, a negative pressure is applied between overlay tube and core, while a positive pressure is applied inside the core, so that the microtubes do not collapse during the stretching into the final fiber.

A method for producing a hollow-core fiber is known from US 2020/0024178 A1, in the case of which a preform, consisting of a hollow core and an overlay tube made of massive glass, which encases the core, is drawn into a hollow-core fiber. To connect core and overlay tube during the drawing, a negative pressure is applied between overlay tube and core, while a gas is introduced into the hollow core in order to prevent a collapsing of the core.

Technical Object

Anti-resonant hollow-core fibers and in particular those comprising nested structural elements have complex inner geometries, which makes their exact and reproducible production more difficult. This applies all the more, because small dimensional deviations in the magnitude of the working wavelength of the light to be guided can already not be tolerated in order to adhere to the resonance or anti-resonance conditions, respectively. The configuration of the fiber preform can be the cause of deviations from the target geometry, and they can also occur due to uncontrolled deformations, which are not to scale, during the adding.

Each structural deviation from the target geometry during the adding of an overlay tube to a cladding tube, which is provided with anti-resonance element preforms, reduces the quality of the final anti-resonant hollow-core fiber.

It is the goal of the invention to specify a method for the cost-efficient production of an anti-resonant hollow-core fiber, which avoids limitations of conventional production methods.

It is a further goal of the invention to provide a method, which provides for a large-volume production of anti-resonant hollow-core fibers.

It is in particular the goal of the invention to provide a method for producing a preform for anti-resonant hollow-core fibers, by means of which a high precision of the structural elements is attained, if possible, in a reproducible manner when adding an overlay tube to a cladding tube.

Preferred Embodiments of the Invention

The features of the independent claims make a contribution to at least partially fulfilling at least one of the above-mentioned objects. The dependent claims provide preferred embodiments, which contribute to at least partially fulfilling at least one of the objects.

/1/ A method for producing a preform of an anti-resonant hollow-core fiber, which has a hollow core extending along a fiber longitudinal axis, and a cladding region, which surrounds the hollow core and which comprises at least one anti-resonance element, at least having the method steps of
  (a) providing a cladding tube comprising a cladding tube inner surface and a cladding tube outer surface, wherein at least one anti-resonance element preform is arranged at the cladding tube inner surface,
  (b) providing an overlay tube comprising an overlay tube inner surface, wherein the overlay tube has an inner diameter, which is larger than an outer diameter of the cladding tube,
  (c) arranging the cladding tube inside the overlay tube, so that the overlay tube inner surface surrounds the cladding tube outer surface,
  (d) adding the overlay tube to the cladding tube, so that the overlay tube inner surface connects to the cladding tube outer surface,
characterized in that
a first negative pressure P1 is applied between overlay tube inner surface and cladding tube outer surface, and a second negative pressure P2 is applied inside the cladding tube during the adding in method step (d).

/2/ The method according to embodiment 1, characterized in that the first negative pressure P1 lies in a range of −100 mbar to −10 mbar, and the second negative pressure P2 lies in a range of −50 mbar to −1 mbar compared to an ambient pressure.

/3/ The method according to embodiment 1 or 2, characterized in that the first negative pressure P1 has a larger amount than the second negative pressure P2.

/4/ The method according to any one of the preceding embodiments, characterized in that a third negative pressure P3 is applied during the adding in method step (d) inside the at least one anti-resonance element preform.

/5/ The method according to embodiment 4, characterized in that the third negative pressure P3 has the same amount as the second negative pressure P2.

/6/ The method according to embodiment 4, characterized in that the third negative pressure P3 has a different amount than the first negative pressure P1 and the second negative pressure P2, in particular that the third negative pressure has a smaller amount than the second negative pressure P2.

/7/ The method according to any one of the preceding embodiments, characterized in that prior to method step (d), the cladding tube is closed in a gas-impermeable manner at a first cladding tube end, and in some regions, the overlay tube inner surface is connected in a gas-impermeable manner to the cladding tube outer surface at a second cladding tube end.

/8/ The method according to embodiment 7, characterized in that the cladding tube has a holding ball at the second cladding tube end in order to arrange the cladding tube inside the overlay tube in method step (c).

/9/ The method according to any one of embodiments 7 or 8, characterized in that the cladding tube is closed in a gas-impermeable manner at the first cladding tube end by forming a tip.

/10/ The method according to any one of embodiments 7 to 9, characterized in that the first negative pressure P1 is applied in the region of the first cladding tube end, and the second negative pressure P2 is applied in the region of the second cladding tube end.

/11/ The method according to embodiment 10, characterized in that the first negative pressure P1 is attached by means of a first holding pipe, which is attached to a first overlay tube end facing the first cladding tube end, and the second negative pressure P2 is applied by means of a second holding pipe, which is attached to a second overlay tube end facing the second cladding tube end.

/12/ The method according to any one of embodiments 9 to 11, characterized in that the tip is inserted into a perforated disk prior to method step (d).

/13/ The method according to any one of the preceding embodiments, characterized in that the first negative pressure P1 is applied first, and then the second negative pressure P2.

/14/ The method according to any one of the preceding embodiments, characterized in that the preform is elongated during the adding in method step (d).

General Matters

In the present description, range specifications also include the values mentioned as limits. A designation of the type "in the range of X to Y" with regard to a variable A thus means that A can take the values X, Y, and values between X and Y. Ranges limited on one side of the type "up to Y" for a variable A therefore mean Y and less than Y as value.

Some of the described features are linked with the term "essentially". The term "essentially" is to be understood in such a way that under real conditions and manufacturing techniques, a mathematically exact interpretation of terms, such as "overlapping" "perpendicular", "diameter", or "parallelism" can never be provided exactly, but only within certain manufacturing-related error tolerances. For example, "essentially perpendicular axes" draw an angle of 85 degrees to 95 degrees to one another, and "essentially identical volumes" comprise a deviation of up to 5% by volume. A "device essentially consisting of quartz glass" comprises, for example, a quartz glass portion of ≥95 to ≤100% by weight. An "essentially complete filling of a volume B" comprises, for example, a filling of ≥95 to ≤100% by volume of the total volume of B.

DETAILED DESCRIPTION

The invention relates to a method for producing a preform of an anti-resonant hollow-core fiber. A providing of a cladding tube comprising a cladding tube inner side and a cladding tube outer surface takes place as part of a method step (a), wherein at least one anti-resonance element preform is arranged at the cladding tube inner surface.

A method step (b) comprises a providing of an overlay tube comprising an overlay tube inner surface, wherein the overlay tube has an inner diameter, which is larger than an outer diameter of the cladding tube.

A method step (c) comprises an arranging of the cladding tube inside the overlay tube, so that the overlay tube inner surface surrounds the cladding tube outer surface, in particular essentially concentrically.

A method step (d) comprises an adding of the overlay tube to the cladding tube, so that the overlay tube inner surface connects to the cladding tube outer surface, in particular by means of a substance-to-substance bond.

The solution of the objects is attained in that a first negative pressure P1 is applied between overlay tube inner surface and cladding tube outer surface, and a second negative pressure P2 is applied inside the cladding tube, and optionally also inside the anti-resonance element preforms at least during the adding of the overlay tube to the cladding tube in method step (d) in order to provide for the adding while simultaneously highly preserving the precision of the structural elements, in particular of the cladding tube and of the anti-resonance element preforms in a reproducible manner.

The preform is that component, from which the anti-resonant hollow-core fiber can be drawn. In the alternative, the preform can be further processed into a secondary preform, from which the anti-resonant hollow-core fiber is drawn. This further processing can comprise a one-time or repeated performance of hot-forming processes, such as, e.g., elongating, collapsing, or adding additional cladding material.

A cladding tube is a tubular element made essentially of quartz glass for arranging the anti-resonance element preforms at a cladding tube inner surface. When drawing the final preform, the cladding tube surrounds the hollow core of the anti-resonant hollow-core fiber. In an embodiment, the cladding tube has an inner diameter in the range of 10 to 60 mm. In an embodiment, the cladding tube has an outer diameter in the range of 25 to 250 mm, preferably of 30 to 200 mm. In an embodiment, the cladding tube has a length in the range of 400 to 1200 mm.

The anti-resonance elements can be simple or nested structural elements of the hollow-core fiber. They have at least two walls, which, viewed from the direction of the hollow core, have a negative curvature (convex) or no curvature (flat, straight). They generally consist of a material, which is transparent for the work light, for example of glass, in particular of doped or undoped quartz glass ($SiO2$), a plastic, in particular of a polymer, of a composite material, or of crystalline material.

Tubular components or component parts of the preform, which essentially turn into anti-resonance elements in the hollow-core fiber by means of simple elongation during the fiber-drawing process, are referred to as anti-resonance element preforms. In an embodiment, the anti-resonance preforms at least partially have a wall thickness in the range of 0.1 to 3 mm, preferably in the range of 0.1 to 2 mm, more preferably in the range of 0.2 to 1.5 mm. The anti-resonance element preforms can be simple or nested components, to which positioning aids can additionally be fixed. The anti-resonance element preforms have at least two walls, which, viewed from the direction of the hollow core, have a negative curvature (convex) or no curvature (flat, straight). By means of the further processing of the preform, in particular by means of hot-forming steps, intermediate products can be created, in which the original anti-resonance element preforms are present in a shape, which is changed compared to the original shape.

An overlay tube is a tubular element, which is made essentially of quartz glass and which, as part of the method according to the invention, is arranged around the cladding tube, and which is connected to the latter, in particular by means of a substance-to-w substance bond by means of heat input, for example via a flame process, such as, for instance, a hydrogen torch, or a flame-free process, such as, for example, by means of an electric furnace using a first negative pressure P1 (the so-called "adding"). When using a comparatively thin cladding tube, the overlay tube ensures additional cladding material during the formation of the final anti-resonant hollow-core fiber, and thus provides for the use of a comparatively thin cladding tube for arranging the anti-resonance element preforms.

The components of the preform, which are made essentially of quartz glass, can have a doping. A doping provides for the adaptation of the thermal expansion coefficients of adjacent preform components in order to avoid or to reduce tensions. Fluorine, chlorine and/or hydroxyl groups are preferably used as doping agents, which lower the viscosity of quartz glass. The doping can also be used to reduce the thermal stability of a component part in favor of the stability of an adjacent component part. For instance, it has proven to be favorable during the adding, when the quartz glass of the cladding tube has a viscosity, which, at a measuring temperature of 1250° C., is at least 0.5 dPa·s higher, preferably a viscosity, which is at least 0.6 dPa·s higher than the quartz glass of additionally applied cladding material (when specifying the viscosity as logarithmic value in dPa·s).

In method step (c), the cladding tube is arranged inside the overlay tube, so that the cladding tube outer surface faces the overlay tube inner surface. For this purpose, the overlay tube has an inner diameter, which is larger than the outer diameter of the cladding tube. In an embodiment, the inner diameter of the overlay tube is 1 to 15 mm larger than the outer diameter of the cladding tube. This allows for an arrangement, which can be carried out easily, of the cladding tube inside the overlay tube, and a substance-to-substance bond of overlay tube inner surface with cladding tube outer surface is possible simultaneously by means of thermal heat input in method step (d) during the adding. If the diameters differ by more than 15 mm, a substance-to-substance bond of overlay tube and cladding tube would only be possible under uncontrolled plastic deformations of the preform, which would negatively impact the photoconductivity of the final anti-resonant hollow-core fiber.

The goal of the adding in method step (d) is a substance-to-substance bond between overlay tube inner surface and cladding tube outer surface by means of heat input. The heat input has to take place in such a way that a substance-to-substance bond between the materials of the two elements is possible. This can be attained in that the overlay tube inner surface and the cladding tube outer surface at least partially change from the solid aggregate state into the liquid, in particular viscous, aggregate state.

The heat input can be realized in different ways, for example by means of:

flame-based processes: based on the oxidation of an exothermically reacting gas. One example is the use of hydrogen—also referred to as "H2"—as combustion gas (the flame hydrolysis). It reacts with the oxygen—also referred to as "O2"—in the air; or
  flame-free processes: use other systems, which heat up and which do not require an open flame. One example is the use of a resistor, which is able to convert electrical energy into thermal energy (heat).

To provide for the adding, the first negative pressure P1 is applied between the overlay tube inner surface and the cladding tube outer surface, at least as part of method step (d). The first negative pressure P1 contributes to the better reproducibility, in that it creates additional forces, which act inwards, during the adding, so that random fluctuations of other method parameters, which can lead to an uncontrolled adding process, are compensated. A gap, resulting from a difference between inner diameter of the overlay tube and outer diameter of the cladding tube, can thus also be closed in a reproducible manner without streaking and/or air pockets inside the preform.

The heat input required during the adding in method step (d) does not only lead to an at least partial softening of the overlay tube inner surface and of the cladding tube outer surface, but the anti-resonance element preforms also change at least partially from the solid aggregate state into the liquid, in particular viscous, aggregate state. Due to the softening, there is furthermore the risk of an uncontrolled and unwanted structural deformation of the individual components, which negatively impacts the quality of the final anti-resonant hollow-core fiber. The structural dimensions, which are lower compared to the overlay tube, and a smaller thermal mass associated therewith, can in particular result in uncontrolled structural deformations of the cladding tube and of the at least one anti-resonance element preform.

It became apparent during the production of a preform of an anti-resonant hollow-core fiber that a negative pressure between overlay tube inner surface and cladding tube outer surface at least partially leads to an uncontrolled expanding of the cladding tube. To prevent this and to thus ensure a precise and reproducible shaping of a preform of an anti-resonant hollow-core fiber, the invention discloses an applying of a first negative pressure P1 between overlay tube inner surface and cladding tube outer surface, and of a second negative pressure P2 inside the cladding tube, at least during the adding in method step (d).

This concept allows for a reproducible and precise production method for preforms of an anti-resonant hollow-core fiber on an industrial scale.

According to the invention, a relative pressure, which lies below the ambient pressure surrounding the preform, is understood to be a negative pressure. A negative pressure of, for example, −50 mbar corresponds to a negative pressure difference of 50 mbar compared to the ambient pressure, which would correspond to a pressure of 950 mbar, for example at an ambient pressure of 1000 mbar. A maximally possible negative pressure is reached when applying a complete vacuum and would correspond to the surrounding ambient pressure.

During the adding in method step (d), the first negative pressure P1 and the second negative pressure P2 can assume different values compared to the ambient pressure.

An embodiment of the method is characterized in that the first negative pressure P1 lies in a range of −150 mbar to −5 mbar, preferably in a range of −120 mbar to −5 mbar, more preferably in a range of −100 mbar to −10 mbar, and the second negative pressure P2 lies in a range of −100 mbar to −1 mbar, preferably in a range of −70 mbar to −1 mbar, more preferably in a range of −50 mbar to −1 mbar compared to an ambient pressure. In this way, the adding in method step (d) takes place in a reproducible and precise manner under only slight and controllable deformations of the components of the preform, in particular of the cladding tube and of the anti-resonance element preforms. If the first negative pressure P1 has a higher amount than 150, unwanted deformations of the components of the preform occur, in particular of the cladding tube and of the at least one anti-resonance element preform. In the case of an amount of the first negative pressure P1 smaller than 5, in contrast, no reproducibly precise substance-to-substance bond of overlay tube and cladding tube takes place. If the second negative pressure P2 has an amount higher than 100, a partial uncontrolled collapsing of the cladding tube occurs, which results in negative impacts on the quality of the final anti-resonant hollow-core fiber. If the second negative pressure P2, in contrast, has an amount smaller than 1, or if even a positive pressure is applied, uncontrolled deformations occur, in particular an inflating, of the cladding tube and of the anti-resonance element preforms, which likewise results in negative impacts on the quality of the final anti-resonant hollow-core fiber.

An embodiment of the method is characterized in that the first negative pressure P1 has a larger amount than the second negative pressure P2. A smaller pressure is thus applied between overlay tube inner surface and cladding tube outer surface than inside the cladding tube. This allows for a substance-to-substance bond of overlay tube inner surface and cladding tube outer surface, without uncontrolled deformation, in particular expansion, of the cladding tube and/or of the anti-resonance preforms.

It has proven to be advantageous that a pressure difference in a range of 3 to 60 mbar, preferably between 5 and 40 mbar, more preferably between 10 and 35 mbar, is present between the first negative pressure P1 and the second negative pressure P2.

The method can be designed in such a way that the second negative pressure P2 is applied in the entire cladding tube, thus also inside the anti-resonance element preforms, at least during the adding in method step (d).

An embodiment of the method is characterized in that a third negative pressure P3 is applied inside the at least one anti-resonance element preform, at least during the adding in method step (d). This allows for an even finer adjustment of the different pressure ratios and thus for an even more precise production method as a function of the selected materials and/or wall thicknesses of the individual components of the preform.

The second negative pressure P2 and the third negative pressure P3 can thereby have different amounts as well as the same amount.

An embodiment of the method is characterized in that the third negative pressure P3 has a different amount than the first negative pressure P1 and the second negative pressure P2, in particular that the third negative pressure P3 has a smaller amount than the second negative pressure P2, and preferably also a smaller amount than the first negative pressure P1. In an embodiment, the third negative pressure P3 lies in a range of −100 mbar to −1 mbar, preferably in a range of −70 mbar to −1 mbar, more preferably in a range of −50 mbar to −1 mbar, even more preferably in a range of −10 mbar to −1 mbar compared to an ambient pressure. If the third negative pressure P3 has a smaller amount than the second negative pressure P2, thus if a higher pressure acts inside the anti-resonance element performs than in the surrounding cladding tube, the risk of a destruction of the anti-resonance element preforms by means of collapsing is reduced. Instead, a slight inflating of the anti-resonance element preforms can occur, which, in contrast to a collapsing, has fewer negative impacts on the quality of the final anti-resonant hollow-core fiber.

The different negative pressures P1, P2, and optionally P3, can be applied in a variety of ways in order to produce the preform. An embodiment of the method is designed in such a way that at least the first negative pressure P1 and the second negative pressure P2 are applied at a same end of the preform, which is to be produced.

To provide for an application of the different negative pressures P1, P2, and optionally P3 for producing the preform, the components of the preform can be arranged to one another and/or connected to one another in different ways.

An embodiment of the method is characterized in that prior to method step (d), the cladding tube is closed in a gas-impermeable manner at a first cladding tube end, and in some regions, the overlay tube inner surface is connected in a gas-impermeable manner to the cladding tube outer surface at a second cladding tube end, which is axially opposite to the first cladding tube end. The gas-impermeable closing of the first cladding tube end can be attained, for example, by means of thermal melting-together by forming a tip, in particular a tip of quartz glass, or by means of a gas-tight closure, which is attached to the first cladding tube end. In a preferred embodiment of the invention, the first cladding tube end, in particular the tip, is arranged on the bottom of the preform, which is to be produced, viewed from the earth's surface.

The gas-impermeable connecting of overlay tube inner surface and cladding tube outer surface in the region of the second cladding tube end can be attained, for example, via a local heat input, which establishes a radially circumferential substance-to-substance bond of overlay tube inner surface and cladding tube outer surface, for example via an axial expansion of 20 to 60 mm. It can be advantageous to apply a negative pressure between overlay tube inner surface and cladding tube outer surface in order to form the gas-impermeable connection.

The application of the respective negative pressures can take place at the same spatial end of the preform, which is to be produced.

An embodiment of the method is characterized in that the first negative pressure P1 is applied in the region of the first cladding tube end, and the second negative pressure P2 is applied in the region of the second cladding tube end. This provides for a simplified process for steric reasons.

The arrangement of the cladding tube inside the overlay tube can be realized in different ways.

An embodiment of the method is characterized in that the cladding tube has a holding ball at the second end in order to arrange the cladding tube inside the overlay tube in method step (c). A holding ball is to be understood as an, in particular spherically designed, section or attachment of the cladding tube with a diameter, in particular outer diameter, which is enlarged compared to the remaining cladding tube, and which is designed to be larger than a diameter, in particular inner diameter, of the overlay tube. This allows for an insertion of the cladding tube, first end first, into the overlay tube, until the holding ball is reached, which cannot be introduced into the overlay tube due to the larger diameter. Due to the fact that, as part of the method, the individual components of the preform are perpendicular to the earth's surface, and in particular the second end of the cladding tube is thereby arranged perpendicular above the first end of the cladding tube, viewed from the earth's surface, the holding ball allows for an uncomplicated and safe hooking of the cladding tube into the overlay tube. In an embodiment, the cladding tube is deformed at the second end, in particular by means of heat input and pressurized air, by forming the holding ball. In a further, preferred embodiment, the holding ball is connected, for example by means of a substance-to-substance bond, as separate component to the second end of the cladding tube prior to the arranging of the cladding tube inside the overlay tube. It is preferred thereby that the holding ball, as well as the cladding tube, is shaped of quartz glass with identical or similar composition so as not to create any thermally induced tensions during the input. The cladding tube interior is connected in a gas-conductive manner to the surrounding area of the cladding tube via a fluid-conducting opening in the holding ball. To provide for a gas exchange around the holding ball, the holding ball can have grooves, notches, or other types of depressions, which run axially.

The application of the respective negative pressures to the preform, which is to be produced, can be realized in a variety of ways.

An embodiment of the method is characterized in that the first negative pressure P1 is attached by means of a first holding pipe, which is attached to a first overlay tube end facing the first cladding tube end, and the second negative pressure P2 is applied by means of a second holding pipe, which is attached to a second overlay tube end facing the second cladding tube end.

A holding pipe is to be understood as a component, which is in particular made of quartz glass or metal and which is shaped in a hood-like manner, comprising a holding pipe opening and a holding pipe edge surrounding the holding pipe opening. The holding pipe edge is designed to be attached to an axial overlay tube and to be connected to the latter in a gas-impermeable manner, for example by means of heat input, over the entire circumference of the holding pipe edge. This establishes a mechanical fastening of the holding pipe to the overlay tube. In addition, the attached holding pipe closes the overlay tube end, so that no gas exchange with the surrounding area of the preform, which is to be produced, can take place between holding pipe edge and overlay tub end.

The first holding pipe has a first gas connection, which is connected or can be connected in a fluid-conducting manner to the first holding pipe opening. The first holding pipe, in particular the first holding pipe edge, is connected to the first overlay tube end, at least during the adding in method step (d), so that the first gas connection is connected or can be connected in a fluid-conducting manner to the gap between the overlay tube inner surface and the cladding tube outer surface via the first holding pipe opening and the first overlay tube end. If the overlay tube inner surface is connected in a gas-impermeable manner at the second end to the cladding tube outer surface, the first negative pressure P1 can be applied via the first gas connection. A positive pressure can also be applied via the first gas connection, or the first gas connection can be closed in a fluid-conducting manner.

The second holding pipe has a second gas connection, which is connected or can be connected in a fluid-conducting manner to the second holding pipe opening. The second holding pipe, in particular the second holding pipe edge, is connected to the second overlay tube end at least during the adding in method step (d), so that the second gas connection is also connected or can be connected in a fluid-conducting manner to the second cladding tube end via the second holding pipe opening, and if a holding ball is present, also via the holding ball. If the first cladding tube end is closed in a gas-impermeable manner, the second negative pressure P2 can be applied via the second gas connection. A positive pressure can also be applied via the second gas connection, or the second gas connection can be closed in a fluid-conducting manner.

An embodiment of the method is characterized in that the first cladding tube end, in particular the first cladding tube end which is shaped into the tip, is arranged in a perforated disk.

The perforated disk has at least one axially running hole, which is designed to receive the first cladding tube end, in particular the first cladding tube end which is shaped into the tip, in such a way that the cladding tube, in particular the first cladding tube end, is fixed inside the overlay tube. In an embodiment, the perforated disk is formed as part of the first holding pipe, in particular as part of the first holding pipe edge. To provide for a gas exchange between first gas connection and the gap between the overlay tube inner surface and the cladding tube outer surface, the perforated disk has at least one axial lead-through, which runs through the perforated disk.

The perforated disk can be formed from different materials, wherein quartz glass is preferred, because it avoids thermal tensions.

When carrying out the method, the different negative pressures can be applied simultaneously or in a different order.

An embodiment of the method is characterized in that the first negative pressure P1 is applied first, and then the second negative pressure P2. An already applied first negative pressure P1 is advantageous in particular for the partial gas-impermeable connecting of overlay tube inner surface and cladding tube outer surface to the second cladding tube end.

An embodiment of the method is characterized in that the preform is elongated during the adding in method step (d).

During the elongating, the preform is lengthened. The elongating can take place to scale, so that, for example, the shape and arrangement of components or component parts of the preform are reflected in the elongated end product. During the elongating, however, the primary preform can also be drawn not to scale, and the geometry thereof can be changed.

The production of the preform can be concluded with the conclusion of the adding in method step (d) and the optional elongating. In further embodiments, a secondary preform is produced from the preform by means of further processing, wherein the further processing comprises a one-time or repeated performance of one or several of the following hot-forming processes:

i. elongating,
ii. collapsing,
iii. collapsing and simultaneous elongating,
iv. adding additional cladding material,
v. adding additional cladding material and subsequent elongating,
vi. adding additional cladding material and simultaneous elongating.

During the collapsing, an inner bore is narrowed or gaps are closed or narrowed between tubular components. The collapsing is generally associated with an elongating. The secondary preform produced in this way can already be designed and suitable for drawing a hollow-core fiber. The secondary preform can optionally be further processed in that it is, for example, elongated, or additional cladding material is added to it.

Examples

The invention will be illustrated further in an exemplary manner below by means of examples. The invention is not limited to the examples.

FIGURES

The invention will be illustrated further in an exemplary manner below by means of figures. The invention is not limited to the figures.

DESCRIPTION OF THE FIGURES

Figure 1:
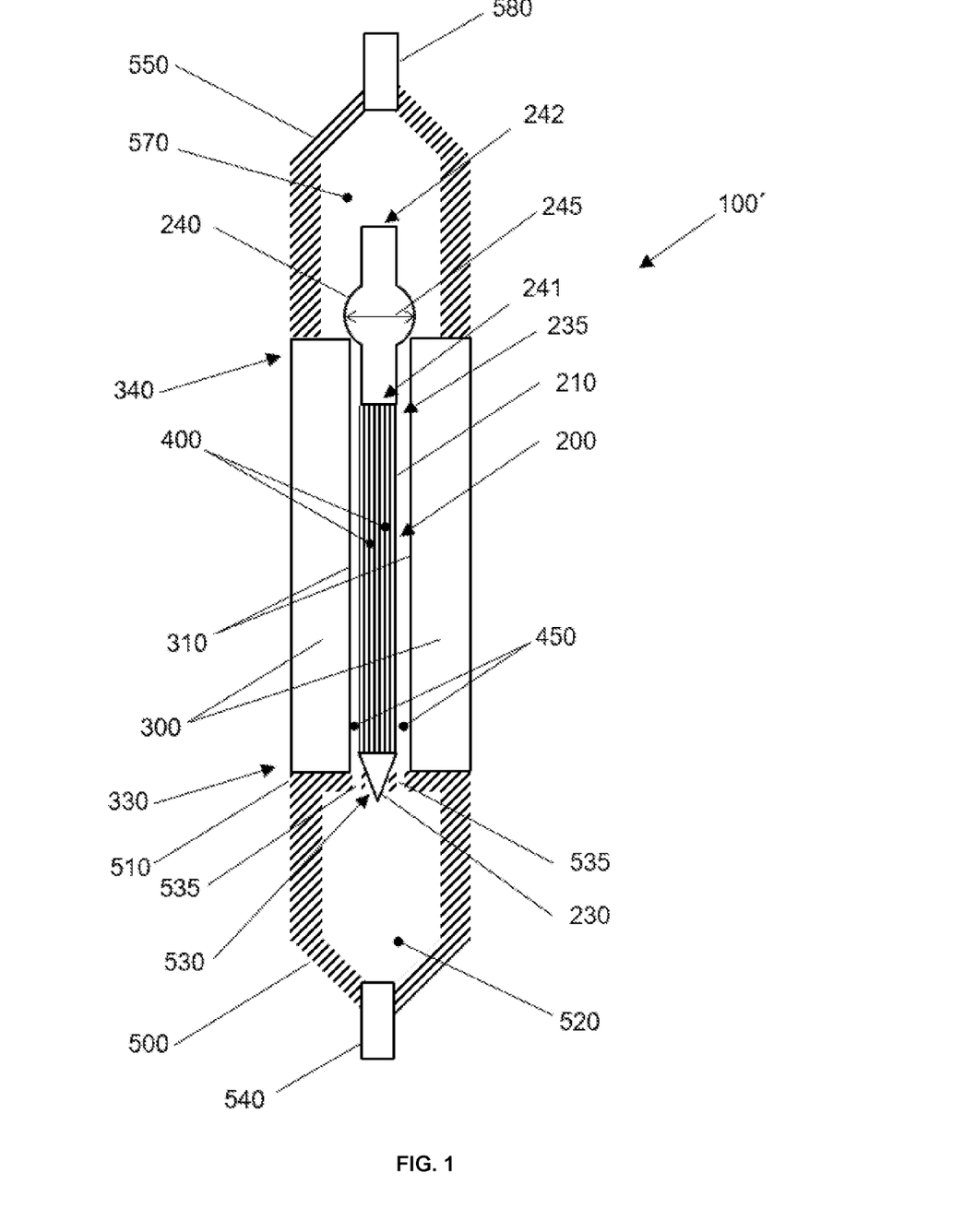
FIG. 1 shows a longitudinal section through a first intermediate product of a method for producing a preform of an anti-resonant hollow-core fiber.

FIG. 1 shows a longitudinal section through an intermediate product 100' of a method for producing a preform of an anti-resonant hollow-core fiber comprising a cladding tube 200 and an overlay tube 300. The cladding tube 200 has a cladding tube outer surface 210 and a cladding tube inner surface, wherein several anti-resonance element preforms 400 are arranged in an axially aligned manner at the cladding tube inner surface and are connected thereto by means of a substance-to-substance bond. The cladding tube 200 is arranged inside the overlay tube 300, so that the cladding tube outer surface 210 is surrounded in a sleeve-like manner by an overlay tube inner surface 310. The cladding tube outer surface 210 has a smaller diameter than the overlay tube inner surface 310, so that a ring-shaped gap 450 is shaped between cladding tube 200 and overlay tube 300. The gap 450 allows for a contact-free, and thus for an undamaged, introduction of the cladding tube 200 into the overlay tube 300. To arrange the cladding tube 200 inside the overlay tube 300, a second cladding tube end 235 is shaped as holding ball 240. In the shown embodiment, the cladding tube 200 and the holding ball 240 are shaped in one piece and of identical material. In further, non-illustrated embodiments, the cladding tube 200 and the holding ball 240 are shaped of different materials, for example, the holding ball 240 is made of a glass, in particular a quartz glass. The holding ball 240 has a holding ball outer diameter 245, which is larger than an inner diameter of the overlay tube 300. In the case of the arrangement of the shown components, which is advantageous for the method and which is designed perpendicular to the earth's surface, wherein the holding ball is attached or shaped to the cladding tube 200 on the top from the earth's surface, this makes it possible to hook the cladding tube 200 into the overlay tube 300. At a first holding ball end 241 facing the cladding tube 200, as well as at a second holding ball end 242 axially opposite to the first holding ball end 241, the holding ball 240 is equipped in a fluid-conducting manner, so that the interior of the cladding tube 200 is connected in a fluid-conducting manner to the surrounding area of the cladding tube 200 via the holding ball 240. To provide for a gas exchange around the holding ball 240, thus between the contact point of holding ball 240 and overlay tube 300, the holding ball 240 can in particular have a holding ball outer surface, grooves, notches, or other types of axially running depressions (not shown). A first cladding tube end 230 facing the earth's surface is shaped as tip, which closes the first cladding tube end 230 in a fluid-conducting manner. In the shown embodiment, a gas exchange between the interior of the cladding tube 200 and the surrounding area of the cladding tube 200 can only take place via the holding ball 240 at the second cladding tube end 230.

A first overlay tube end 330 facing the first cladding tube end 230 is axially connected to a first holding pipe 500, which is designed in a hood-like manner, in particular to a first holding pipe edge 510 of the first holding pipe 500. On a side facing the first cladding tube end 230, the first holding pipe 500 is shaped as a perforated disk 530, in which the first cladding tube end 230, which is shaped as tip, is received, and is thus fixed against lateral movement. This prevents the partial or complete destruction of the overlay tube 300 and/or of the cladding tube 200 by means of uncontrolled relative movements of these two components of the first intermediate product 100' relative to one another. In addition, the axial alignment of the cladding tube 200 inside the overlay tube 300 is facilitated by means of the perforated disk 530. In the shown embodiment, the first holding pipe 500 and the perforated disk 530 are shaped in one piece. In further embodiments, the perforated disk 530 is shaped as separate component, preferably of a quartz glass.

The first holding pipe 500 has a first holding pipe interior space 520, which is connected in a fluid-conducting manner to the gap 450 between overlay tube inner surface 310 and cladding tube outer surface 210 via axially running leadthroughs 535 in the perforated disk 530. At an end opposite the overlay tube 300, the first holding pipe 500 has a first gas connection 540. The first gas connection 540 can be reversibly opened in a fluid-conducting manner and can be closed in a fluid-conducting manner. The first gas connection 540 can optionally be connected to the surrounding area of the first intermediate product 100', a reservoir for gases, such as, for example, nitrogen or argon, and to a negative pressure source for applying a negative pressure, or the first gas connection 540 can be closed in a gas-impermeable manner.

A second overlay tube end 340 facing the second cladding tube end 235 is axially connected to a second holding pipe 550, which is designed in a hood-like manner.

The second holding pipe 550 has a second holding pipe interior space 570, which is connected in a fluid-conducting manner to the interior of the cladding tube 200 via the holding ball 240. At an end opposite the overlay tube 300, the second holding ball 550 has a second gas connection 580. The second gas connection 580 can be reversibly opened in a fluid-conducting manner and can be closed in a fluid-conducting manner. The second gas connection 580 can optionally be connected to the surrounding area of the first intermediate product 100', a reservoir for gases, such as, for example, nitrogen or argon, and to a negative pressure source for applying a negative pressure, or the second gas connection 580 can be closed in a gas-impermeable manner.

In the shown stage of the method for producing a preform of an anti-resonant hollow-core fiber, the first gas connection 540 and the second gas connection 580 are opened in a fluid-conducting manner, wherein a gas, for example nitrogen or argon, is introduced through the first gas connection 540. The gas flows through the first holding pipe 500 and the first intermediate product 100', and is discharged again through the second gas connection 580, whereby the ambient air, which was previously obtained in the first intermediate product 100', is removed as completely as possible, and an adding of the overlay tube 300 to the cladding tube 200, which follows as part of the method, is prepared.

Figure 2:
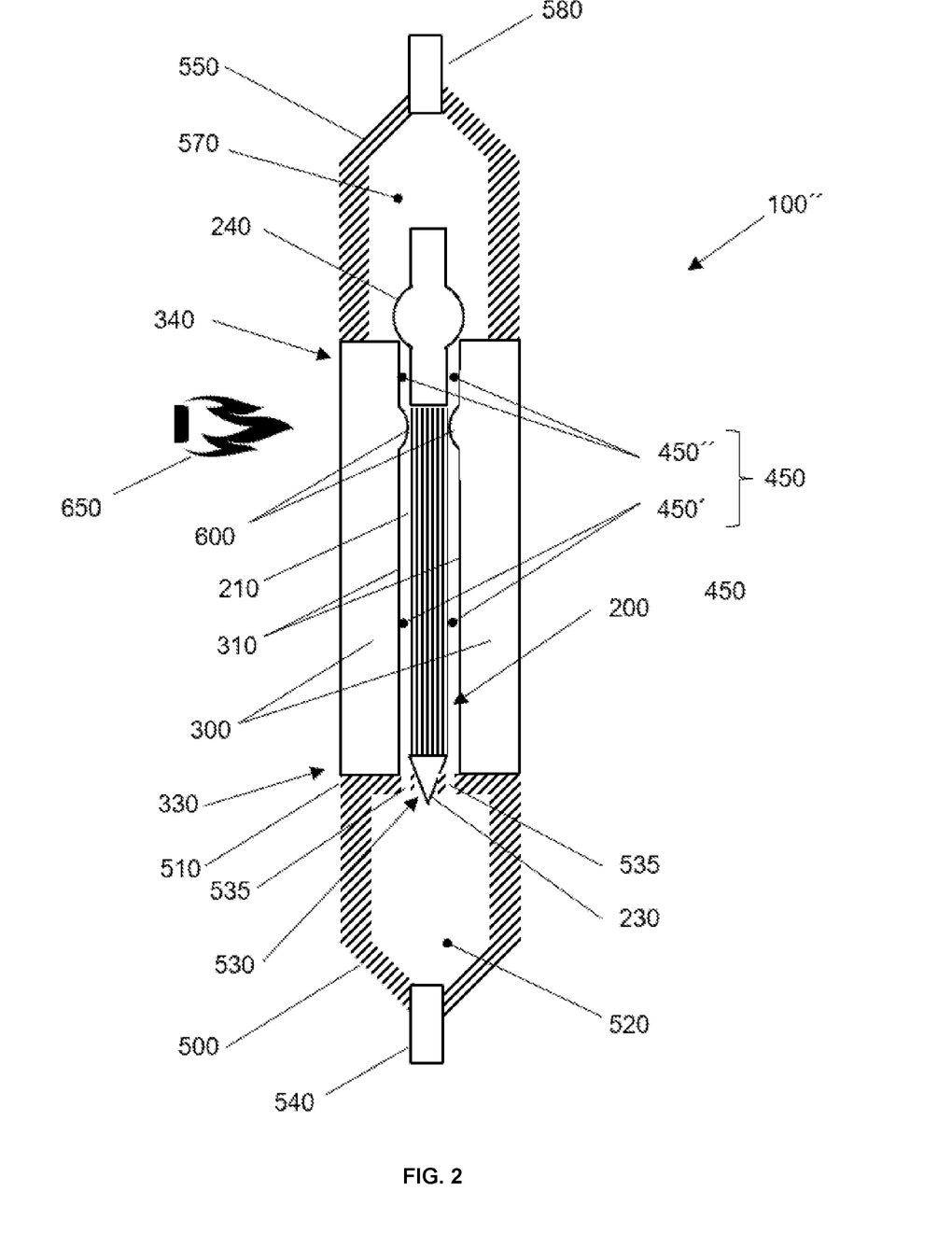
FIG. 2 shows a longitudinal section through a second intermediate product of the method for producing a preform of an anti-resonant hollow-core fiber.

FIG. 2 shows a longitudinal section through a second intermediate product 100", which is produced from the first intermediate product 100' from FIG. 1, of the method for producing a preform of an anti-resonant hollow-core fiber. The second intermediate product 100" differs from the first intermediate product 100' from FIG. 1 in that the overlay tube 300, in particular the cladding tube outer surface 210, is connected in a gas-impermeable manner to the overlay tube 300, in particular the overlay tube inner surface 310, in the region of the second cladding tube end 235 via a ring-shaped connecting point 600.

To connect the overlay tube 300 to the cladding tube 200, the second gas connection 580 was closed in a fluid-conducting manner, and the first gas connection 540 was connected in a fluid-conducting manner to a negative pressure source, for example to a vacuum pump. A substance-to-substance bond of overlay tube inner surface 310 and cladding tube outer surface 210 takes place via the negative pressure, which is created in such a way in the gap 450, in combination with a locally limited heat supply 650, which is applied around the overlay tube 300 in a ring-shaped manner, in the region of the connecting point 600, which is to be produced. For example, the materials are heated up in the region of the connecting point 600 by means of an electric furnace (not shown) at an operating temperature in the range of 1950° C. to 2150° C. in order to provide for the substance-to-substance bond of overlay tube inner surface 310 and cladding tube outer surface 210.

The connecting point 600 divides the gap 450 between overlay tube inner surface 310 and cladding tube outer surface 210 into a first gap section 450', which faces the first holding pipe 500 and which is connected thereto in a fluid-conducting manner, and a second gap section 450", which faces the second holding pipe and which is connected thereto in a fluid-conducting manner.

Figure 3:
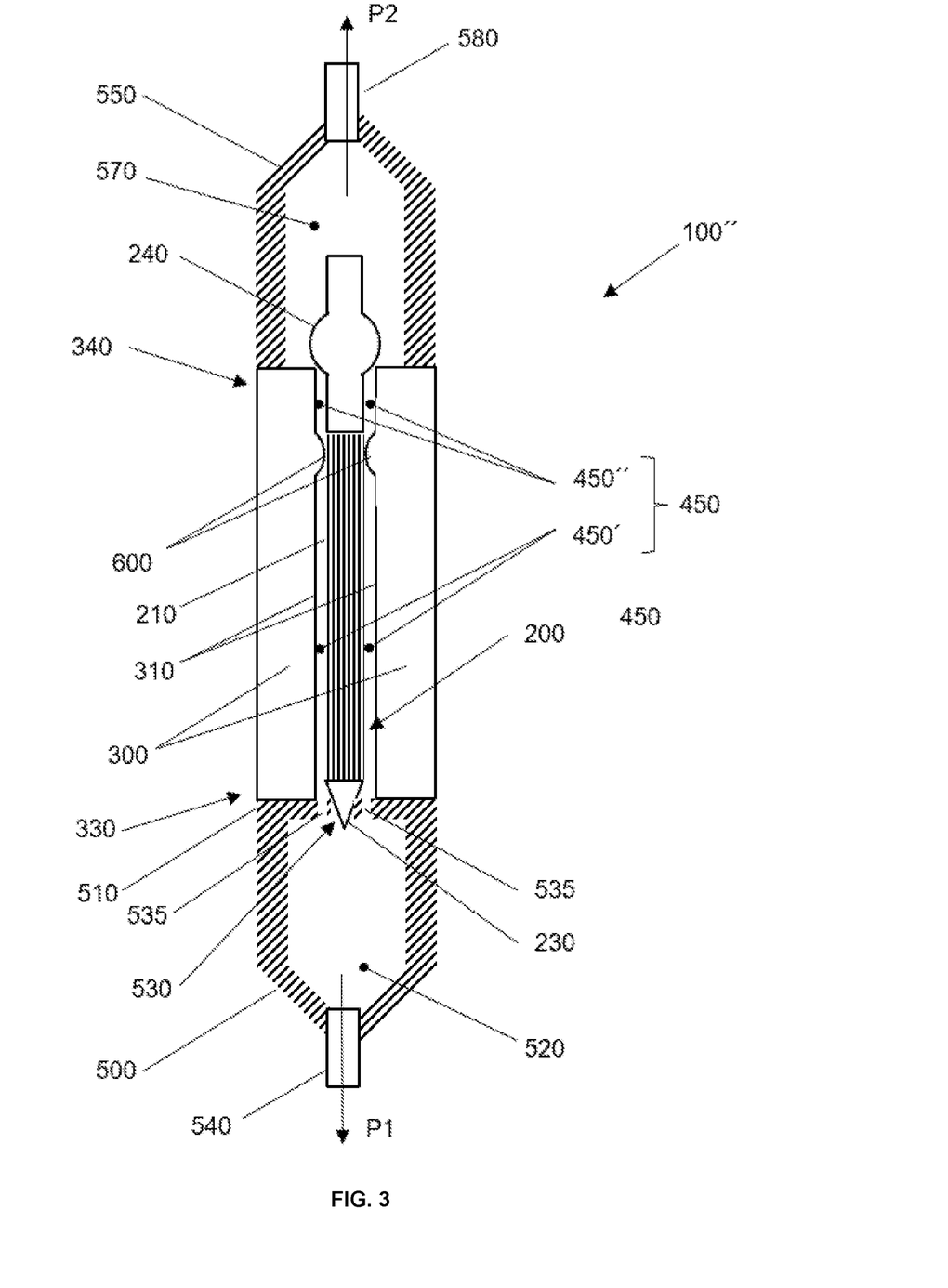
FIG. 3 shows a longitudinal section through the second intermediate product of the method for producing a preform of an anti-resonant hollow-core fiber when applying a first negative pressure P1 and a second negative pressure P2.

FIG. 3 shows the second intermediate product 100" from FIG. 2 in an advanced stage of the method for producing a preform of an anti-resonant hollow-core fiber. The connecting point 600 has divided the second intermediate product 100" into two pressure regions, which are separated from one another. A first pressure region comprises the first holding pipe, in particular the first holding pipe interior space 520 and the first gap section 450'. A second pressure region comprises the second holding pipe 550, in particular the second holding pipe interior space 570, the holding ball 240 and the inside of the cladding tube 200, together with the anti-resonance element preforms 400. The first gas connection 540 and the second gas connection 580 are opened in a fluid-conducting manner and are each connected to a separate negative pressure source, for example each to a separate vacuum pump. This provides for an application of a first negative pressure P1 in the first pressure region and, independently thereof, for an application of a second negative pressure P2 in the second pressure region, and thus for an adding of the overlay tube 300 to the cladding tube 200 while simultaneously highly preserving the precision of the cladding tube 200 and of the anti-resonance element preforms 400 in a reproducible manner as part of the further method.

Figure 4:
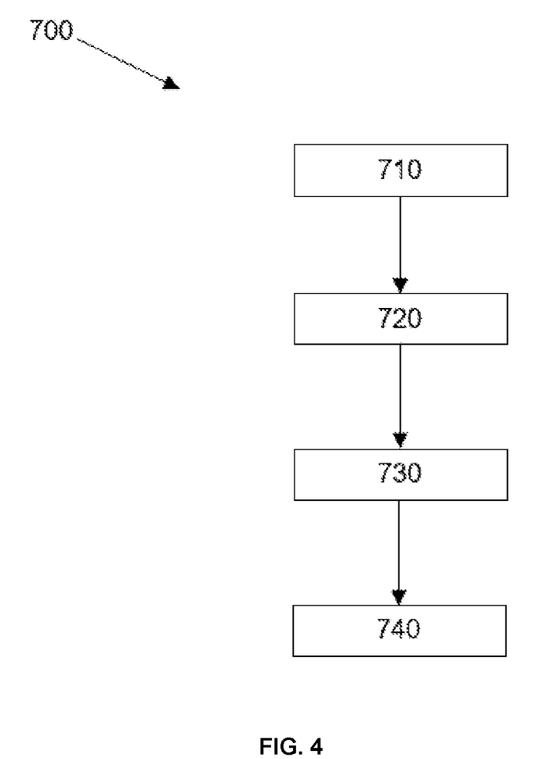
FIG. 4 shows a flow chart of a method for producing a preform.

FIG. 4 shows an embodiment of a method 700 for producing a preform of an anti-resonant hollow-core fiber, at least having the method steps of:
(a) providing 710 a cladding tube 200, comprising a cladding tube inner surface and a cladding tube outer surface 210, wherein at least one anti-resonance element preform 400 is arranged at the cladding tube inner surface,
(b) providing 720 an overlay tube 300 comprising an overlay tube inner surface 310, wherein the overlay tube 300 has an inner diameter, which is larger than an outer diameter of the cladding tube 200,
(c) arranging 730 the cladding tube 200 inside the overlay tube 300, so that the overlay tube inner surface 310 surrounds the cladding tube outer surface 210,
(d) adding 740 the overlay tube 300 to the cladding tube 200, so that the overlay tube inner surface 310 connects to the cladding tube outer surface 210.

It is provided thereby that a first negative pressure P1 is applied between overlay tube inner surface 310 and cladding tube outer surface 210, and a second negative pressure P2 is applied inside the cladding tube 200 during the adding 740 in method step (d) in order to provide for the attaching while simultaneously highly preserving the precision of the structural elements, in particular of the cladding tube 200 and of the anti-resonance element preforms 400 in a reproducible manner.

The features disclosed in the description can be significant for various designs of the claimed invention, both separately and in any combination with one another. The features disclosed for the preform, the anti-resonant hollow-core fiber, or the intermediate products of the method are also disclosed for the method and vice versa.

REFERENCE NUMERALS

100' first intermediate product of a method for producing a preform of an anti-resonant hollow-core fiber
100" second intermediate product of a method for producing a preform of an anti-resonant hollow-core fiber
200 cladding tube
210 cladding tube outer surface
230 first cladding tube end
235 second cladding tube end
240 holding ball
241 first holding ball end
242 second holding ball end
245 holding ball outer diameter
300 overlay tube
310 overlay tube inner surface
330 first overlay tube end
340 second overlay tube end
400 anti-resonance element preforms
450 gap
450' first gap section
450" second gap section
500 first holding pipe
510 first holding pipe edge
520 first holding pipe interior space
530 perforated disk
535 lead-throughs in the perforated disk
540 first gas connection
550 second holding pipe
570 second holding pipe interior space
580 second gas connection
600 connecting point
650 heat supply
700 method for producing a preform of an anti-resonant hollow core fiber
710 providing a cladding tube
720 providing an overlay tube
730 arranging the cladding tube inside the overlay tube
740 adding the overlay tube to the cladding tube
P1 first negative pressure
P2 second negative pressure

The invention claimed is:

1. A method (700) for producing a preform of an anti-resonant hollow-core fiber, which has a hollow core extending along a fiber longitudinal axis, and a cladding region, which surrounds the hollow core and which comprises at least one anti-resonance element, at least having the method steps of
(a) providing (710) a cladding tube (200) comprising a cladding tube inner surface and a cladding tube outer surface (210), wherein at least one anti-resonance element preform (400) is arranged at the cladding tube inner surface,
(b) providing (720) an overlay tube (300) comprising an overlay tube inner surface (310), wherein the overlay tube (300) has an inner diameter, which is larger than an outer diameter of the cladding tube (200),
(c) arranging (730) the cladding tube (200) inside the overlay tube (300), so that the overlay tube inner surface (310) surrounds the cladding tube outer surface (210),
(d) adding (740) the overlay tube (300) to the cladding tube (200), so that the overlay tube inner surface (310) connects to the cladding tube outer surface (210),
wherein a first negative pressure P1 is applied between overlay tube inner surface (310) and cladding tube outer surface (210), and a second negative pressure P2 is applied inside the cladding tube (200) during the adding (740) in method step (d), and
wherein prior to method step (d), the cladding tube (200) is closed in a gas-impermeable manner at a first cladding tube end (230), and in some regions, the overlay tube inner surface (310) is connected in a gas-impermeable manner to the cladding tube outer surface (210) at a second cladding tube end (235).

2. The method (700) according to claim 1, wherein the first negative pressure P1 lies in a range of −100 mbar to −10 mbar, and the second negative pressure P2 lies in a range of −50 mbar to −1 mbar compared to an ambient pressure.

3. The method (700) according to claim 1, wherein the first negative pressure P1 has a larger amount than the second negative pressure P2.

4. The method (700) according to claim 1, wherein a third negative pressure P3 is applied during the adding (740) in method step (d) inside the at least one anti-resonance element preform (400).

5. The method (700) according to claim 4, wherein the third negative pressure P3 has the same amount as the second negative pressure P2.

6. The method (700) according to claim 4, wherein the third negative pressure P3 has a different amount than the first negative pressure P1 and the second negative pressure P2, in particular that the third negative pressure P3 has a smaller amount than the second negative pressure P2.

7. The method (700) according to claim 1, wherein the cladding tube (200) has a holding ball (240) at the second cladding tube end (235) in order to arrange the cladding tube (200) inside the overlay tube (300) in method step (c).

8. The method (700) according to claim 1, wherein the cladding tube (200) is closed in a gas-impermeable manner at the first cladding tube end (230) by forming a tip.

9. The method (700) according to claim 8, wherein the tip is inserted into a perforated disk (530) prior to method step (d).

10. The method (700) according to claim 1, wherein the first negative pressure P1 is applied in the region of the first cladding tube end (230), and the second negative pressure P2 is applied in the region of the second cladding tube end (235).

11. The method (700) according to claim 10, wherein the first negative pressure P1 is attached by means of a first holding pipe (500), which is attached to a first overlay tube end (230) facing the first cladding tube end (330), and the second negative pressure P2 is applied by means of a second holding pipe (550), which is attached to a second overlay tube end (340) facing the second cladding tube end (235).

12. The method (700) according to claim 1, wherein the preform is elongated during the adding (740) in method step (d).

13. A method (700) for producing a preform of an anti-resonant hollow-core fiber, which has a hollow core extending along a fiber longitudinal axis, and a cladding region, which surrounds the hollow core and which comprises at least one anti-resonance element, at least having the method steps of
  (a) providing (710) a cladding tube (200) comprising a cladding tube inner surface and a cladding tube outer surface (210), wherein at least one anti-resonance element preform (400) is arranged at the cladding tube inner surface,
  (b) providing (720) an overlay tube (300) comprising an overlay tube inner surface (310), wherein the overlay tube (300) has an inner diameter, which is larger than an outer diameter of the cladding tube (200),
  (c) arranging (730) the cladding tube (200) inside the overlay tube (300), so that the overlay tube inner surface (310) surrounds the cladding tube outer surface (210),
  (d) adding (740) the overlay tube (300) to the cladding tube (200), so that the overlay tube inner surface (310) connects to the cladding tube outer surface (210),
  wherein a first negative pressure P1 is applied between overlay tube inner surface (310) and cladding tube outer surface (210), and a second negative pressure P2 is applied inside the cladding tube (200) during the adding (740) in method step (d), and
  wherein the first negative pressure P1 is applied first, and then the second negative pressure P2.

14. The method (700) according to claim 13, wherein the first negative pressure P1 lies in a range of −100 mbar to −10 mbar, and the second negative pressure P2 lies in a range of −50 mbar to −1 mbar compared to an ambient pressure.

15. The method (700) according to claim 13, wherein the first negative pressure P1 has a larger amount than the second negative pressure P2.

16. The method (700) according to claim 13, wherein a third negative pressure P3 is applied during the adding (740) in method step (d) inside the at least one anti-resonance element preform (400).

17. The method (700) according to claim 16, wherein the third negative pressure P3 has the same amount as the second negative pressure P2.

18. The method (700) according to claim 16, wherein the third negative pressure P3 has a different amount than the first negative pressure P1 and the second negative pressure P2, in particular that the third negative pressure P3 has a smaller amount than the second negative pressure P2.

19. The method (700) according to claim 13, wherein the preform is elongated during the adding (740) in method step (d).

* * * * *